United States Patent [19]
Genovese

[11] Patent Number: 5,424,741
[45] Date of Patent: Jun. 13, 1995

[54] RADIATION DETECTABLE INFLATABLE DECOY

[75] Inventor: James A. Genovese, Street, Md.

[73] Assignee: The United States of America as represented by the Secretary of the Army, Washington, D.C.

[21] Appl. No.: 159,608

[22] Filed: Dec. 1, 1993

[51] Int. Cl.⁶ ............................ G01S 7/38; H04K 3/00
[52] U.S. Cl. ............................................. 342/10; 342/9
[58] Field of Search .................................. 342/8, 9, 10

[56] References Cited

U.S. PATENT DOCUMENTS 5,092,244  3/1992  Giglia .................................... 342/10
5,285,213  2/1994  Tusch .................................... 342/10

*Primary Examiner*—Daniel T. Pihulic
*Attorney, Agent, or Firm*—Anthony T. Lane; Edward Goldberg; Michael C. Sachs

[57] ABSTRACT

A multi-dimensional decoy uses a non-combustible exterior to support a reactive interior metal film in the form of a rapidly inflatable balloon to generate an infrared and radar signature to match the thermal and radar profiles of an intended target.

8 Claims, 1 Drawing Sheet

RADIATION DETECTABLE INFLATABLE DECOY

GOVERNMENT INTEREST

The invention disclosed herein may be manufactured, used and licensed by or for the United States Government.

BACKGROUND OF THE INVENTION

There has been an improvement in radar and infrared detection of military targets. In consideration of the advances in modern warfare technology, a variety of missiles have been developed and deployed which employ sensing means to determine the position and structure of potential targets. Examples of such missiles include the "Sidewinder" heat seeking missile, and the "Exocet" a radar guided missile.

In order to counter the aforementioned prior art practice was to use various decoy means which burn or otherwise emit infrared (thermal) radiation to provide a suitable positional and structural perception of the intended target. Decoys if physically and spectrally configured properly will provide a means for aircraft, land-based vehicles, or ships to elude infrared or radar-guided weapons.

Prior art decoys frequently used weapon systems that employed hydrocarbon jells, flare or pyrotechnic compositions to produce a thermal decoy signature to attract the heat seeking weapon away from the real intended target. For decoys against radar guided weapons prior art decoys use metal-coated gas inflated objects.

The problem with the old decoy systems is that modern, infrared detection means have become so accurate and their resolution of target characteristics so improved that they are able to differentiate the prior art decoys from the desired target. Many currently deployed guided weapons can differentiate a one percent change in temperature and thus can accurately differentiate such decoy means from the temperature and size profiles of the actual target. The improved weapons can determine whether it is a jet engine, missile exhaust, or a tank and its occupants. In many missile systems, the algorithm in the target-seeking apparatus of the projectile is sophisticated enough to "look" for thermal gradients in an engine block or exhaust system and thus are not confused by prior art infrared decoy display.

The problem with prior art decoys is that they do not satisfy the need for a rapidly deployable simulation decoy which can accurately mimic the thermal profile and/or radar signature of the intended target and deceive the aforementioned high resolution infrared and radar seeking capabilities of current systems.

SUMMARY OF THE INVENTION

The present invention relates to an improved infrared and/or radar detectable inflatable decoy.

An object of the present invention is to provide a rapidly deployable three-dimensional simulation decoy which can accurately mimic the thermal profile of an intended target.

Another object of the present invention is to provide a rapidly deployable three-dimensional simulation decoy which can accurately mimic the radar signature of an intended target.

Another object of the present invention is to provide a rapidly deployable simulation decoy which does not use hydrocarbon jells or flare/pyrotechnic compositions to produce the thermal profile of an intended target.

Another object of the present invention is to provide a rapidly deployable inflatable three-dimensionable simulation decoy which can accurately mimic both the thermal profile and radar signature of an intended target.

A further object of the present invention is to provide a rapidly deployable three-dimensional simulation decoy which has a protective environment for precision control of a thermal reaction process and eliminates environmental interferences such as rain, relative humidity, and wind.

For a better understanding of the present invention, together with other and further objects thereof, reference is made to the following description taken in connection with the accompanying drawings.

BRIEF DESCRIPTION OF THE DRAWINGS

Throughout the following description like numerals are used to designate like parts of the drawings.

DESCRIPTION OF THE PREFERRED EMBODIMENTS

Figure 1:
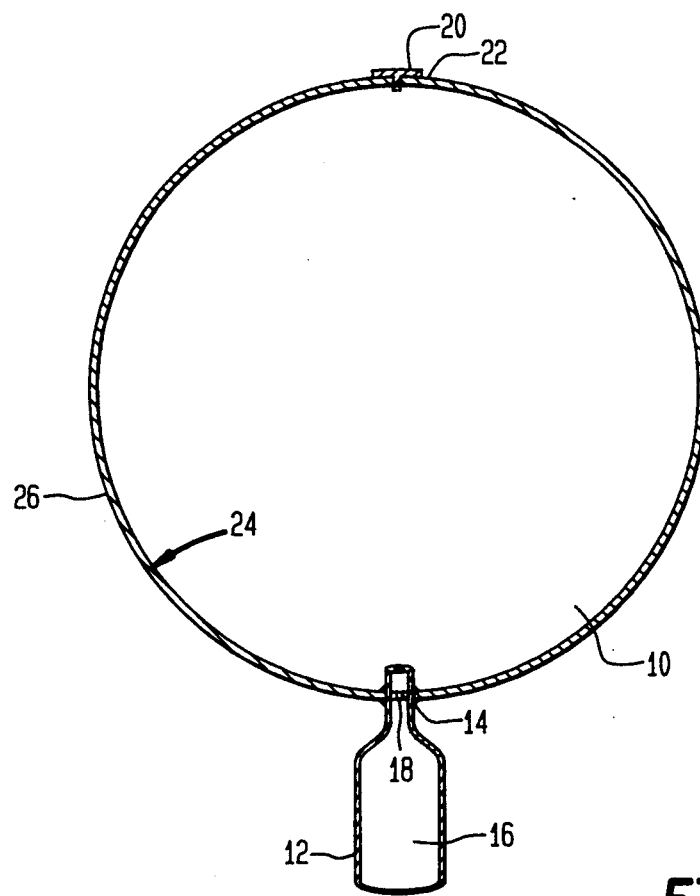
FIG. 1 is a diametral cross-sectional view of an inflatable multi-dimensional decoy display body.

Referring now to FIG. 1 an inflatable balloon display body 10 has a gas generator 12 operatively attached to a lower end 14 of display body 10. A source of inflatant gas material 16 is compressively stored within generator 12 and held therein and released therefrom by a conventionally operated rupture disc 18. A relief valve 20 is positioned on the top surface 22 of display body 10 in order to deflate the decoy 10. An interior metal film or metal composite surface 24 is operatively disposed on the inside surface of an exterior flexible non-combustible substrate 26, such as Kevlar.

Figure 2:
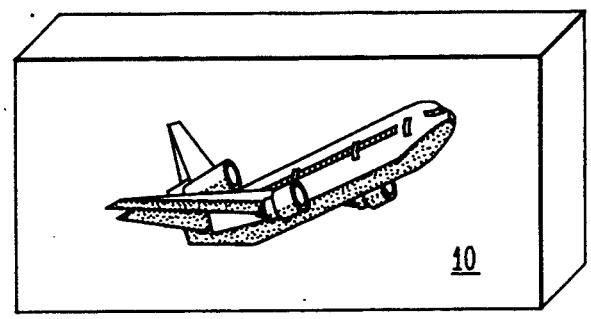
FIG. 2 illustrates a three-dimensional display body formed by an inflatable balloon-like structure of FIG. 1 that is configured in the shape of a box and would simulate the thermal and radar profiles of an airplane.
Figure 3:
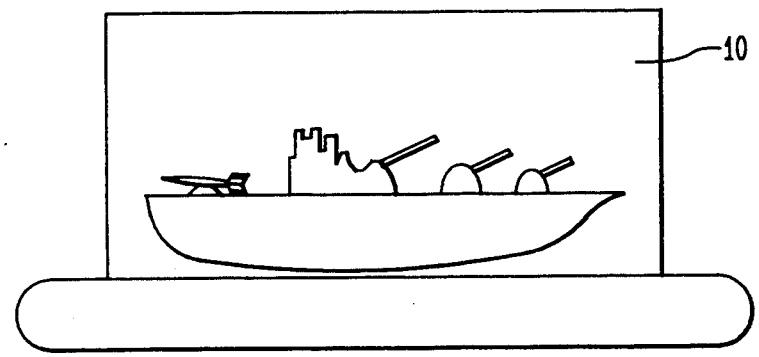
FIG. 3 illustrates a three-dimensional display body formed by an inflatable balloon structure which simulates the thermal and radar profiles of a ship.

In operation, the multi-dimensional balloon display bodies 10 shown in FIGS. 2 and 3 are formed of film or sheet material interiorly positioned as shown by numeral 24 of FIG. 1. The film 24 is made of a combustible material or reactive metal or metal matrix. The film 24 may be achieved by impregnating or depositing a reactive material inside of a non-combustible envelope substrate 26. The sustained heat of reaction necessary to generate the infrared signature of the display body 10 can be accomplished using any particular chemistry that will produce an appropriate heat of reaction with the metal/metal composite film. The metal composite may be comprised of an alloy, metal-hydrocarbon, or metal-polymer matrix to achieve the desired thermal reaction characteristics and heat transfer properties.

Examples of metal/metal composite reactions that are suitable for generating an infrared signature include the following:

a. Metal+Oxygen (air) Metal Oxide+Heat
b. Metal+Oxygen ($O_2$ source) Metal Oxide+Heat
c. Metal+Oxidizer Oxidized Metal+Heat
d. Metal+Acid Metal Salt+$H_2$+Heat The inflatant gas 16 may be the source starting the chemical reaction at the metal surface 24 or it may assist in aerosolizing a chemical that will react with the surface 24. Examples of inflatant compositions causing oxidation reaction include compressed atmospheric air, pyrotechnically generated oxygen and acid gases such as HCl and HF. The composition of the gas/vapor contained in the inflatable decoy may be varied to provide a relatively faster or slower heat of reaction. In addition, the reactive metal film surface 24 can be customized by changing its thickness, chemical make-up and/or surface area to provide a realistic thermal gradient "picture" in order to simulate temperature differentials. With the present invention, utilization of a thin metalic substrate provides the necessary radar profile as well as the thermal reaction site so that a simpler and cheaper decoy material is attainable. The interior metal surface 24 serves both as a site for thermal reaction as well as a non-combustible containment means for the deployed infrared/radar detectable inflatable decoy. The balloon envelope 10 provides a protective environment for precision control of the thermal reaction process and serves to eliminate environmental interferences such as rain, relative humidity and wind.

While a specific embodiment of the invention has been shown and described in detail, to illustrate the application of the principles of the invention, it will be understood that the invention may be embodied otherwise without departing from such principles.

What is claimed is:

1. A multi-dimensional infrared/radar-detectable inflatable decoy which comprises:

balloon means for supporting said decoy;

substrate means for giving strength and form to said balloon means;

reactive metal film means operatively deposited on said substrate means inside surface of said balloon means for generating a thermal and radar profile to match the signature of an intended target;

generator means operatively connected to said balloon means for rapidly inflating and deploying said balloon means;

gas reactant means operatively stored in said generator means for initialing a chemical thermal reaction on said metal film means; and valve means operatively deposed on said balloon means for deflating said balloon means when desired.

2. An inflatable decoy as recited in claim 1 wherein said substrate means includes a non-combustible film.

3. An inflatable decoy as recited in claim 2 wherein said gas reactant means includes a compressed oxidizing gas.

4. An inflatable decoy as recited in claim 2 wherein said gas reactant means includes a compressed acid gas.

5. An inflatable decoy as recited in claim 2 wherein said gas reactant means includes compressed atmospheric air.

6. An inflatable decoy as recited in claim 5 wherein said generator means includes rupture disc means for rapidly releasing said gas reactant means to inflate said decoy.

7. An inflatable decoy as recited in claim 6 wherein said valve means includes a relief valve for deflating said balloon means after it has been deployed.

8. An inflatable decoy as recited in claim 7 wherein said reactive metal film means includes a metal matrix chemically thermally reactive when in contact with said gas means for producing a simulated infrared thermal profile and a radar profile in said decoy to match said intended target.

* * * * *